United States Patent [19]
Kudo

[11] Patent Number: 4,830,473
[45] Date of Patent: May 16, 1989

[54] REAR CONVERSION LENS SYSTEM
[75] Inventor: Yoshinobu Kudo, Osaka, Japan
[73] Assignee: Minolta Camera Kabushiki Kaisha, Osaka, Japan
[21] Appl. No.: 171,953
[22] Filed: Mar. 23, 1988
[30] Foreign Application Priority Data Mar. 23, 1987 [JP] Japan .................. 62-68459

[51] Int. Cl.⁴ .................. G02B 15/02; G02B 9/12; G02B 9/14
[52] U.S. Cl. .................. 350/422; 350/475; 350/477
[58] Field of Search .................. 350/422, 475, 477

[56] References Cited
U.S. PATENT DOCUMENTS 4,394,071 7/1983 Yamada .................. 350/422
4,422,734 12/1983 Tanaka et al. .................. 350/422
4,749,263 6/1988 Taniguchi et al. .................. 350/422

FOREIGN PATENT DOCUMENTS 57-46224 3/1982 Japan .
59-42513 3/1984 Japan .
61-144617 7/1986 Japan .
61-45807 10/1986 Japan .

Primary Examiner—John K. Corbin
Assistant Examiner—Rebecca D. Gass
Attorney, Agent, or Firm—Price, Gess & Ubell

[57] ABSTRACT

Disclosed is a compound lens system consisting of a main lens system and a rear conversion lens system located at the image side of the main lens system, wherein the rear conversion lens system comprises, from the object side to the image side, a first positive single lens component made of a synthetic resin material and having an aspheric surface and a second negative compound lens component consisting of a positive lens element and a negative lens element. The first positive single lens component has a refractive index of a determined value between 1.4 and 1.6. The difference value between a refractive index of the negative lens element and a refractive index of the positive lens element of the second negative compound lens component is selected to be between 0.01 and 0.4. The aspheric surface of the first positive single lens component is formed in such a manner as to compensate for a coma aberration, excessive compensation of a spherical aberration and excessive compensation of field curvature aberration.

14 Claims, 6 Drawing Sheets

F = 2.60

—— d
---- SC

-0.5   0.5
SPHERICAL ABERRATION
&
SINE CONDITION

ω = 31.7°

---- DM
—— DS

-0.5   0.5
ASTIGMATISM

ω = 31.7°

-5.0   5.0
DISTORTION(%)

F = 2.80

-0.5    0.5
SPHERICAL ABERRATION
&
SINE CONDITION

—— d
---- SC

ω = 30°

-0.5    0.5
ASTIGMATISM

---- DM
—— DS

ω = 30°

-5.0    5.0
DISTORTION(%)

F = 5.0

-0.5    0.5

SPHERICAL ABERRATION
&
SINE CONDITION

——— d
----- SC

ω = 17.65°

-0.5    0.5

ASTIGMATISM

----- DM
——— DS

ω = 17.65°

-5.0    5.0

DISTORTION(%)

Fig. 7a
F = 5.0
— d
---- SC
−0.5    0.5
SPHERICAL ABERRATION
&
SINE CONDITION
Fig. 7b
ω = 17.65°
---- DM
— DS
−0.5    0.5
ASTIGMATISM
Fig. 7c
ω = 17.65°
−5.0    5.0
DISTORTION(%)
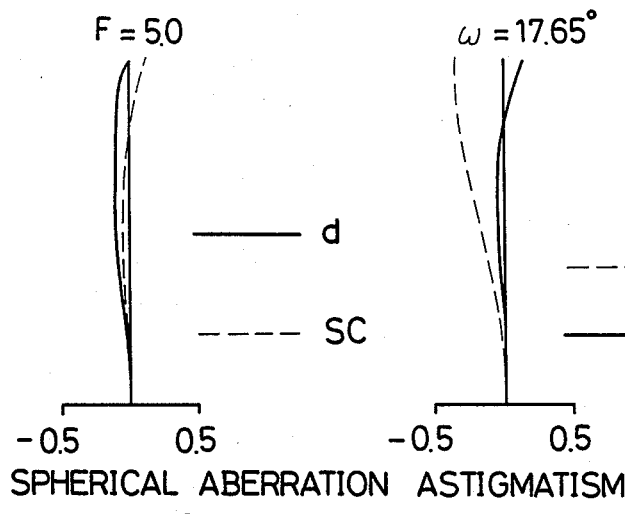
Fig. 8a
F = 5.0
— d
---- SC
−0.5    0.5
SPHERICAL ABERRATION
&
SINE CONDITION
Fig. 8b
ω = 17.65°
---- DM
— DS
−0.5    0.5
ASTIGMATISM
Fig. 8c
ω = 17.65°
−5.0    5.0
DISTORTION(%)
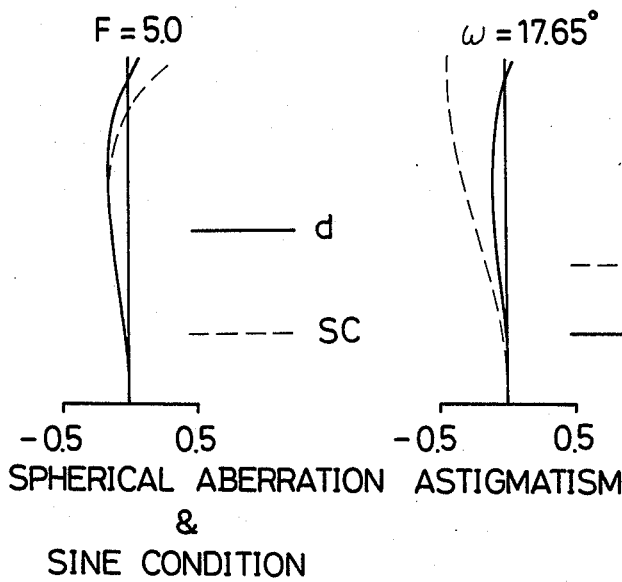

F = 5.0

——— d
----- SC

−0.5　　0.5
SPHERICAL ABERRATION
&
SINE CONDITION

ω = 17.65°

----- DM
——— DS

−0.5　　0.5
ASTIGMATISM

ω = 17.65°

−5.0　　5.0
DISTORTION(%)

F = 5.0

-0.5   0.5
SPHERICAL ABERRATION
&
SINE CONDITION

— d
---- SC $\omega = 17.65°$

-0.5   0.5
ASTIGMATISM

---- DM
— DS $\omega = 17.65°$

-5.0   5.0
DISTORTION(%)

F = 5.0

-0.5   0.5
SPHERICAL ABERRATION
&
SINE CONDITION

— d
---- SC $\omega = 17.65°$

-0.5   0.5
ASTIGMATISM

---- DM
— DS $\omega = 17.65°$

-5.0   5.0
DISTORTION(%)

REAR CONVERSION LENS SYSTEM

BACKGROUND OF THE INVENTION

1. Field of the Invention

The present invention relates to a rear conversion lens system, and more particularly relates to such rear conversion system which can change the focal length of the whole lens system by attaching or detaching it between the main lens system and the image plane.

2. Description of the Prior Art

In recent years, the lens system for the dual-focus camera having a main lens system and a rear conversion lens system has been proposed in the lens shutter camera design. In this system, only a main lens system operates as a photographic lens in a standard focal length condition, while the main lens system is shifted frontward along the optical axis and a rear conversion lens system is inserted behind the main lens system in a telephoto focal length condition.

At present, however, it is hard to say that a sufficient variable ratio has been obtained in the rear conversion lens system. For example, in the Japanese Patent Laid-Open No. 42513/1984, the rear conversion system is constituted with two groups comprising three lenses, but the variable ratio is about 1.5.

SUMMARY OF THE INVENTION

An object of the present invention is to provide a rear conversion lens system having a variable ratio as large as 1.8~2.0 in a simple configuration and at an economical price.

According to the present invention, a compound lens system consisting of a main lens system and a rear conversion lens system located at the image side of the main lens system for obtaining a focal length longer than the focal length of only the main lens system, wherein the rear conversion lens system, comprising from the object side to the image side:

a first positive single lens component made of a synthetic resin material and having an aspheric surface; and a second negative compound lens component consisting of a positive lens element and a negative lens element;

and wherein the rear conversion lens system fulfills the following conditions;

$$1.4 < N_1 < 1.6$$

$$0.01 < N_n - N_p < 0.4$$

$$t_F(h) < r_e[1 - \{1 - (h/r_e)^2\}^{\frac{1}{2}}] - r_k[1 - \{1 - (h/r_k)^2\}^{\frac{1}{2}}] + d_F$$

$$0.1 < -\phi_4 \cdot f < 10.0$$

wherein;

$N_1$ represents refractive index of the first positive single lens component;

$N_n$ represents refractive index of the negative lens element of the second negative compound lens component;

$N_p$ represents refractive index of the positive lens element of the second negative compound lens component;

h represents height from the optical axis of the rear conversion lens system;

$t_F$ (h) represents thickness of the first positive single lens component at the height h in the condition of $0 < h < R_F$;

$r_e$ represents paraxial radius of curvature of the image side surface of the first positive single lens component;

$r_k$ represents paraxial radius of curvature of the object side surface of the first positive single lens components;

$R_F$ represents the minimum value among $|r_e|$, $|r_k|$, and an effective height of the aspheric surface of the first positive single lens component;

$d_F$ represents axial thickness of the first positive single lens component;

$\phi_4$ represents refractive power of a cemented surface on which the positive and negative lens elements of the second negative compond lens component are cemented with each other; and f represents focal length of the compound lens system consisting of the main lens system and the rear conversion lens system.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

DETAILED DESCRIPTION OF THE PREFERRED EMBODIMENTS

Figure 1:
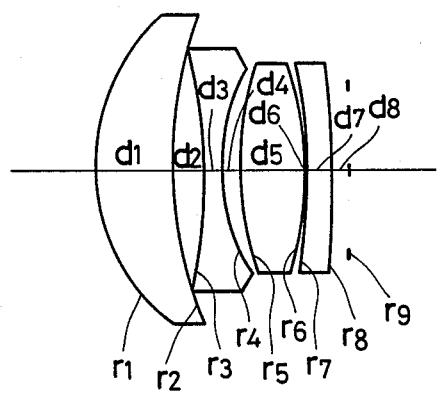
FIG. 1 represents a cross sectional view of a first main lens system whereto a rear conversion lens system in accordance with the present invention can be attached.

The following description is provided to enable any person skilled in the optical and camera field to make and use the invention and sets forth the best modes contemplated by the inventor for carrying our his invention. Various modifications, however, will remain readily apparent to those skilled in the art, since the generic principles of the present invention have been defined herein specifically to provide a relatively economical and easily manufactured rear conversion lens system.

The derivation of the formulas and the relation of the powers set forth herein can be accomplished with the assistance of a computer. The present invention represents the parameters of a compromise balance of acceptable aberrations which can be relatively easily manufactured to provide a low cost lens system for utilization with the lens shutter camera.

In the drawings, schematic cross sectional views disclose the position of the lens groups and lens elements. Due to the number of lens elements involved, it was not deemed appropriate to include individual designation of the radii of curvature and axial distances for each lens element and air space. These values, however, are provided in the accompanying tables set forth herein, and the schematic cross sectional views of the respective embodiments follow the normal conventions of an object at the left-hand side of the drawing and the image plane at the right-hand side.

Figure 5:
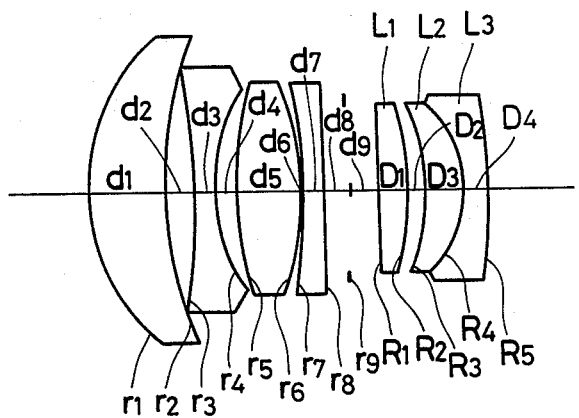
FIG. 5 represents a cross sectional view in the case where the rear conversion lens system by means of the first through the fourth embodiments of the present invention is attached to the above-mentioned first main lens system.
Figure 6A:
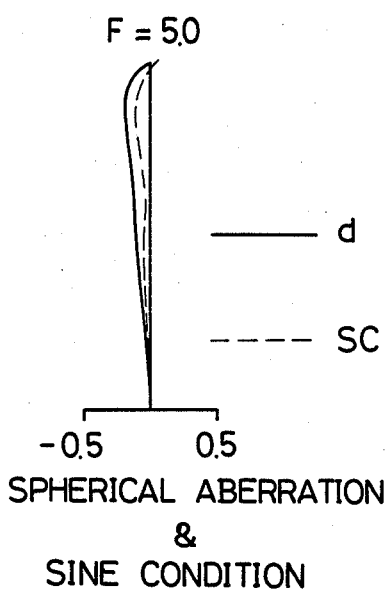
FIGS. 6a to 6c through FIGS. 9a to 9c represent respective aberration curves in the case where the rear conversion lens system according to the first through the fourth embodiments is attached to this main lens system.
Figure 6B:
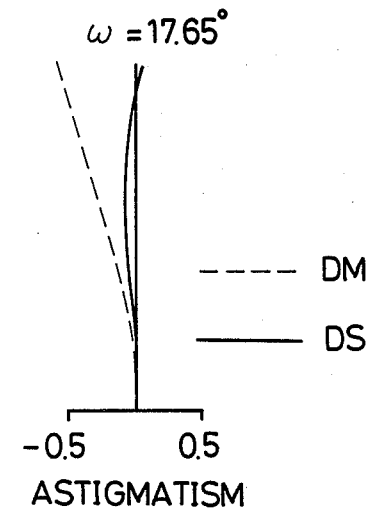
Figure 6C:
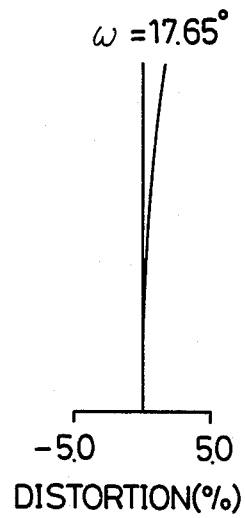
Figures 9A, 9B, 9C, 10:
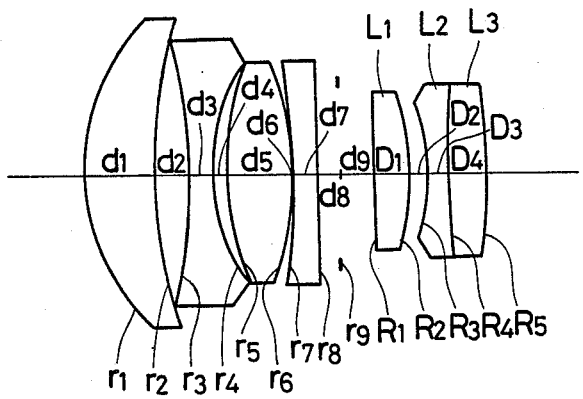
FIG. 10 represents a cross sectional view in the case where the rear conversion lens system according to the fifth and sixth embodiments is attached to the above-mentioned second main lens system.
Figure 11A:
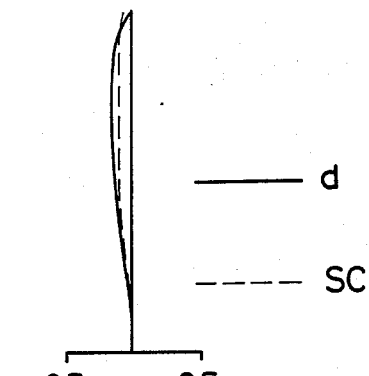
FIGS. 11a to 11c and FIGS. 12a to 12c represent respective aberration curves in the case where the rear conversion lens system according to the fifth and sixth embodiments is attached to this main lens system.
Figure 11B:
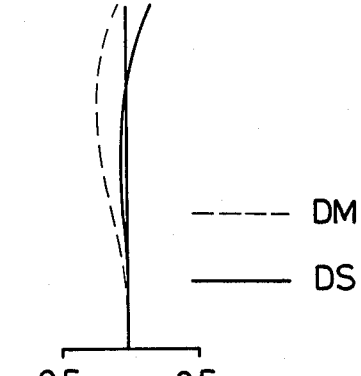
Figure 11C:
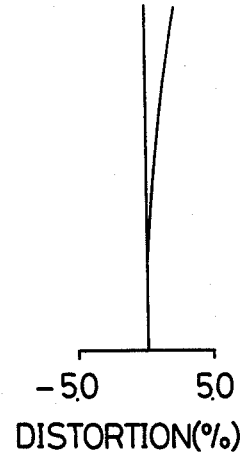
Figure 12A:
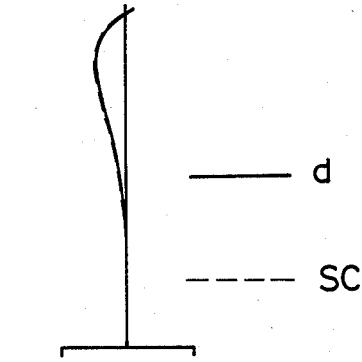
Figure 12B:
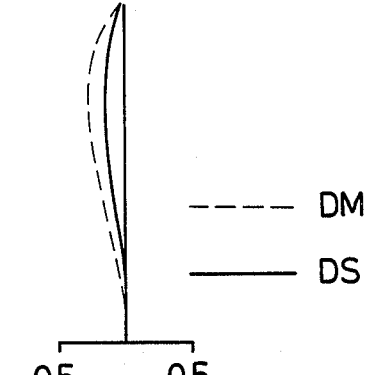
Figure 12C:
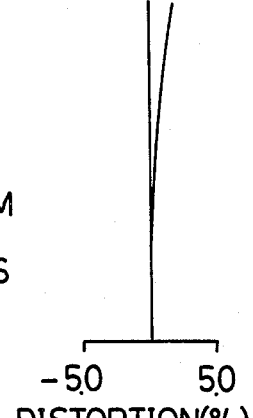

As shown in FIGS. 5 and 10, the present invention provides rear conversion lens system comprising a first positive single lens component ($L_1$) made of a synthetic resin material and having an aspheric surface; and a second negative compound lens component consisting of a positive lens element and a negative lens element ($L_2$, $L_3$)

and wherein the rear conversion lens system fulfills the following conditions;

$$1.4 < N_1 < 1.6 \quad (1)$$

$$0.01 < N_n - N_p < 0.4 \quad (2)$$

$$t_F(h) < r_e[1-\{1-(h/r_e)^2\}^{\frac{1}{2}}] - r_k[1-\{1-(h/r_k)^2\}^{\frac{1}{2}}] + d_F \quad (3)$$

$$0.1 < -\phi_4 \cdot f < 10.0 \quad (4)$$

wherein;

$N_1$ represents refractive index of the first positive single lens component ($L_1$);

$N_n$ represents refractive index of the negative lens element ($L_3$) of the second negative compound lens component;

$N_p$ represents refractive index of the positive lens element ($L_2$) of the second negative compound lens component;

h represents height from the optical axis of the rear conversion lens system;

$t_F(h)$ represents thickness of the first positive single lens component ($L_1$) at the height h in the condition of $0 < h < R_F$;

$r_e$ represents paraxial radius of curvature of the image side surface of the first positive single lens component ($L_1$);

$r_k$ represents paraxial radius of curvature of the object side surface of the first positive single lens components ($L_1$);

$R_F$ represents the minimun value among $|re|$, $|rk|$, and an effective height of the aspheric surface of the first positive single lens component ($L_1$);

$d_F$ represents axial thickness of the first positive single lens component ($L_1$);

$\phi_4$ represents refractive power of a cemented surface on which the positive and negative lens elements ($L_2$, $L_3$) of the second negative compound lens component are cemented with each other; and f represents focal length of the compound lens system consisting of the main lens system and the rear conversion lens system. In more detail, according to FIG. 5, the second negative compound lens component consists of a positive lens element ($L_2$) and a negative lens element ($L_3$) cemented to the positive lens element ($L_2$) from the object side. On the other hand, according to FIG. 10, the second negative compound lens component consists of a negative lens element ($L_2$) and a positive lens element ($L_3$) cemented to the negative lens element ($L_2$) from the object side.

To increase the variable ratio of the rear conversion lens system from about 1.5 to 1.8~2.0, the negative power of the whole rear conversion lens system is required to be intensified. This means that the power of the negative lens constituting the rear conversion lens system has to be intensified and the power of the positive lens has to be weakened, and resultingly, the Petzval sum takes a negative large value. Accordingly, it is advantageous to decrease the refractive index of the positive lens to the utmost and increase the refractive index of the negative lens to the utmost in suppressing the Petzval sum at a low value. For this reason, in the present invention, as shown in the condition (1), the refractive index of the single lens ($L_1$) of the first group which is a positive lens is suppressed at a possible smallest value.

The lower limit value of the condition (1) shows the lower limit value of usable optical material. On the other hand, if the index exceeds the upper limit, the Petzval sum of the rear conversion lens system becomes an excessively large negative value, and even in the case where the rear conversion lens system is attached to the main lens system, the Petzval sum is likely to take a negative value.

For the positive lens and the negative lens of the cemented lenses and of the second group, it is also required to decrease the refractive index of the positive lens to the utmost and increase the refractive index of the negative lens to the utmost to nicely compensate the Petzval sum. The relationship between the refractive indexes of these two lenses and is shown by the condition (2). If the difference exceeds the lower limit of the condition (2), the difference between the refractive index of the negative lens and that of the positive lens becomes small, and therefore the Petzval sum takes a negative large value. On the other hand, a difference exceeding the upper limit is advantageous in compensating the Petzval sum, but overruns the range of refractive index of the optical glass comparatively well used at present.

Then, when the variable ratio is increased by intensifying the power of the negative lens and weakening the power of the positive lens, the spherical aberration is excessively compensated, and the field curvature is also excessively compensated. When this is intended to be compensated by the whole rear conversion lens system, the power balance is broken, and the Petzval sum takes a negative large value, and compensations of the distortion aberration and longituidal chromatic aberration become difficult to be made. In the present invention, these spherical aberration and field curvature are compensated by introducing an aspherical surface into the single lens ($L_1$) of the first group. This means that an aspherical surface is installed whereon the higher the height of a ray of light from the optical axis, the more intensively the ray refracts than the spherical surface, and thereby an excessive compensation of the spherical aberration which is an on-axis aberration is compensated.

This means that the positive single lens is formed in a manner that the positive refractive power becomes larger with advance toward the periphery. Also, an excessive compensation of the field curvature of off-axis aberration can be compensated by an aspherical surface of the shape as mentioned above. Furthermore, this aspherical surface nicely compensates simultaneously the coma aberration apt to be generated in the lower-side rays of light of off-axis luminous flux. The condition (3) shows the shape of this aspherical surface, and when the range of the condition (3) is exceeded, the excessive compensation of the spherical aberration and the field curvature become difficult to be compensated.

By introducing an aspherical surface into the single lens ($L_1$) and compensating the spherical aberration and the field curvature nicely to some extent, the power balance can be kept in a good state by the rear cemented lenses ($L_2$) and ($L_3$), and accordingly, the trend that the Petzval sum becomes negatively large can be reduced to the utmost, and the remaining aberration can be nicely compensated. In addition, in the present invention, this single lens ($L_1$) is constituted with synthetic resin, and thereby the configuration of the aspherical surface is facilitated and the cost is reduced.

In the present invention, the lenses ($L_2$) and ($L_3$) which are the second and the third lenses counted from the object side are constituted with cemented lenses, and thereby consideration on the error of air gap in constituting and assembling the lens-barrel can be dispensed with, and a high-precision rear conversion lens system can be constituted more easily. Also, the adoption of cemented lenses can shorten the total length and can make the system compact.

Also, in the present invention, by setting the refractive power of the cemeneted surface negative, the principal point of the rear conversion lens system is brought nearer to the main lens system side. Thereby, the negative power of the whole rear conversion lens system is weakened, and the same variable ratio can be obtained while the negative increase in the Petzval sum is reduced. Here, by setting the refractive power of the cemented surface negative, the excessive compensation of the spherical aberration is increased, but this raises no problem because of the nice compensation by the above-mentioned aspherical surface.

The condition (4) defines the refractive power of the cemented surface. When the lower limit of the condition (4) is exceeded, the Petzval sum increases and a good compensation of aberration becomes difficult to be made at a high variable ratio. On the other hand, when the upper limit of the condition (4) is exceeded, the spherical aberration becomes large and an excessive compensation is made, and a good compensation becomes difficult to be made even by the aspherical surface. Also, the excessive compensation of the field curvature becomes difficult to be compensated.

By meeting the above conditions, a rear conversion lens system which has a good performance against aberration and a variable power as high as $1.8 \sim 2.0$ can be provided at an economical price.

Furthermore, in the case of achieving a higher variable power, the condition (4) is desirably within the following range to perform the aberration compensation with a better balance kept.

$$1.3 < -\phi_4 \cdot f < 4.0 \quad (4)$$

Figure 2A:
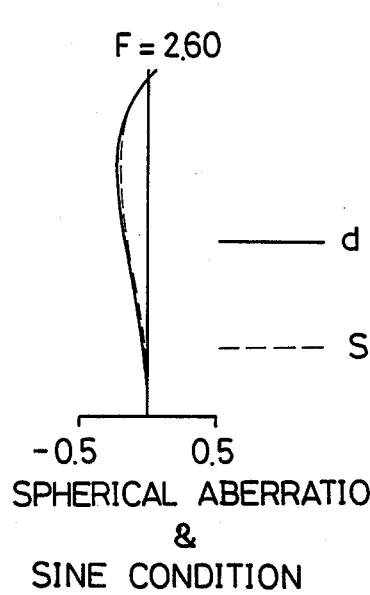
FIGS. 2a to 2c represent aberration curves of the above-mentioned main lens system.
Figure 2B:
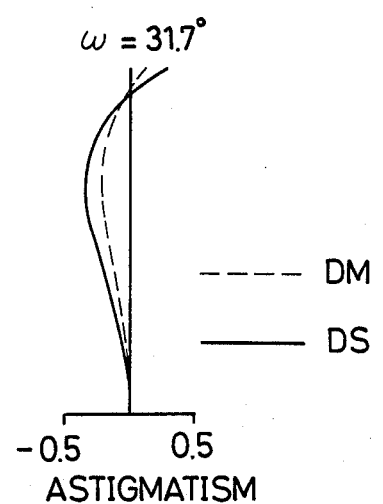
Figure 2C:
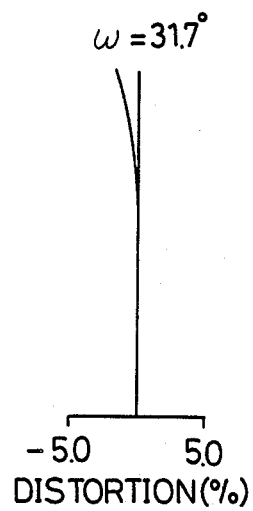
Figure 3:
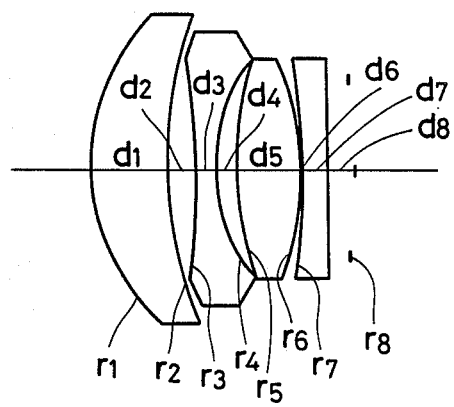
FIG. 3 represents a cross sectional view of a second main lens system whereto the rear conversion lens system in accordance with the present invention can be attached.
Figure 4A:
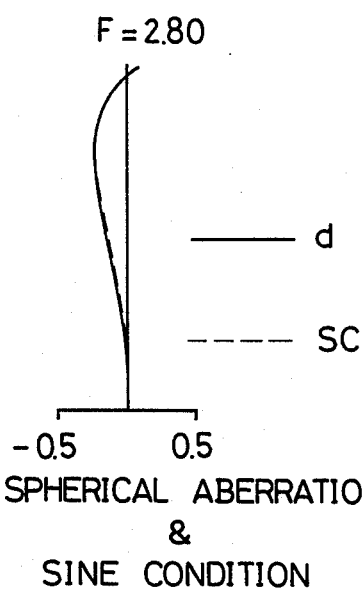
FIGS. 4a to 4c represent aberration curves of the above-mentioned second main lens system.
Figure 4B:
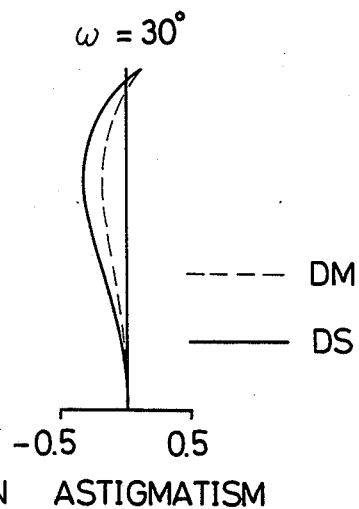
Figure 4C:
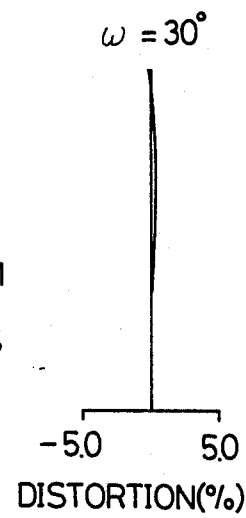

Hereinafter, embodiments in accordance with the present invention are shown. Embodiments $1 \sim 4$ are examples that the rear conversion lens system of the present invention is attached to the main lens system I of which cross sectional view is shown in FIG. 1 and of which aberration curves are shown in FIG. 2. These embodiments realize a variable power of about 2. Embodiments 5 and 6 are examples that the rear conversion lens system of the present invention is attached to the main lens system II of which cross sectional view is shown in FIG. 3 and of which aberration curves are shown in FIG. 4. These embodiments realize a variable ratio of about 1.8.

Referring to FIGS. 1 and 3, respectively, each of the main lens systems I and II used in the embodiments has an aspherical surface, and this was designed in pursuit of compactness and a higher performance of the main lens system itself, and the effectiveness of the rear conversion lens system of the present invention is invariable even in the case where the main lens system is all constituted with the spherical surface system.

In the following tables, f equals a focal length, F represents an F number, $2\omega$ is an angle of view, $r_1, r_2, \ldots$ and $R_1, R_2, \ldots$ are radii of curvature with respective sub number indicating the surfaces from the object to image side along the optical axis, $d_1, d_2, \ldots$ and $D_1, D_2, \ldots$ represent the axial distance and includes both air spaces and the actual thickness of the lenses along the optical axis, $n_1, n_2, \ldots$ equal the refractive indexes of respective lenses and again, the sub number refer to the particular optical element from the object to image side, and $\nu_1, \nu_2, \ldots$ and $V_1, V_2$, equal Abbe numbers of respective lenses sequentially counted from the object side.

In each table, asterisk (*) represents the aspheric surface.

The shape of the aspheric surface is expressed by the following equation, $$X = \frac{y}{r_i + r_i\sqrt{1 - \left(\frac{y}{r_i}\right)^2}} + \alpha y^2 + \beta y^4 + \gamma y^6$$

where, the x ordinate is taken in the direction of optical axis, the y ordinate is taken in the direction perpendicular thereto and the paraxial curvature is represented by ri. Note that $\alpha, \beta, \gamma \ldots$ are coefficients of aspherical surface, and in the embodiments, the coefficients of aspherical surface of the main lens system is represented by a, b, c, ..., and the coefficient of aspherical surface of the rear conversion lens system by A, B, C, .... Also, in the tables of the embodiments, $\Delta(h)$ is a difference between the thickness of aspherical surface at a height h and the radius of paraxial curvature of that surface, being evaluated by the following equation.

$$\Delta(h) = t_F(h) - \left( re\left\{ 1 - \sqrt{1 - \left(\frac{h}{re}\right)^2} \right\} \right) -$$

$$rk\left\{1 - \sqrt{1 - \left(\frac{h}{re}\right)^2}\right\} + d_F$$

In FIGS. 2, 4, 6, 7, 8, 9, 11 and 12, the line d shows a spherical aberration, the dotted line SC shows a sine condition, the dotted line DM shows an astigmatism in a meridional image plane and the line DS shows an astigmatism in a sagital image plane.

TABLE 1

(Main lens I)
$f = 35.0 \quad F = 2.60 \quad 2\omega = 63.4°$

| Radius of Curvature | Distance | Refractive Index | Abbe Number |
|---|---|---|---|
| $r_1$ 11.965 | $d_1$ 4.500 | $n_1$ 1.69680 | $\nu_1$ 56.47 |
| $r_2$ 24.785 | $d_2$ 1.800 | | |
| $r_3$ −35.651 | $d_3$ 1.200 | $n_2$ 1.64769 | $\nu_2$ 33.88 |
| $r_4$ 11.098 | $d_4$ 1.100 | | |
| $r_5$ 19.423 | $d_5$ 4.000 | $n_3$ 1.77250 | $\nu_3$ 49.77 |
| $r_6$ −19.423 | $d_6$ 0.150 | | |
| $r_7^*$ −28.159 | $d_7$ 1.300 | $n_4$ 1.49140 | $\nu_4$ 57.82 |
| $r_8$ −91.526 | $d_8$ 1.300 | | |

TABLE 1-continued (Main lens I)
$f = 35.0 \quad F = 2.60 \quad 2\omega = 63.4°$

| Radius of Curvature | Distance | Refractive Index | Abbe Number |
|---|---|---|---|
| $r_9$ Diaphragm | | | |

$a = 0.0, b = -0.12491 \times 10^{-4}, c = -0.42177 \times 10^{-7}, d = 0.11229 \times 10^{-7}$
$e = 0.44337 \times 10^{-12}, f = -0.85153 \times 10^{-16}$

TABLE 2

(Main lens II)
$f = 38.0 \quad F = 2.80 \quad 2\omega = 60°$

| Radius of Curvature | Distance | Refractive Index | Abbe Number |
|---|---|---|---|
| $r_1$ 12.266 | $d_1$ 4.600 | $n_1$ 1.69680 | $\nu_1$ 56.47 |
| $r_2$ 27.112 | $d_2$ 1.650 | | |
| $r_3$ −38.243 | $d_3$ 1.200 | $n_2$ 1.63980 | $\nu_2$ 34.55 |
| $r_4$ 11.108 | $d_4$ 1.260 | | |
| $r_5$ 20.546 | $d_5$ 3.700 | $n_3$ 1.75450 | $\nu_3$ 51.57 |
| $r_6$ −20.516 | $d_6$ 0.150 | | |
| $r_7^*$ −37.813 | $d_7$ 1.500 | $n_4$ 1.49140 | $\nu_4$ 57.82 |
| $r_8$ −500.000 | $d_8$ 1.300 | | |
| $r_9$ Diaphragm | | | |

$a = 0.0, b = -0.74385 \times 10^{-5}, c = 0.20710 \times 10^{-6}, d = 0.69128 \times 10^{-8}$
$e = 0.40660 \times 10^{-12}, f = 0.15528 \times 10^{-16}$

TABLE 3

(Embodiment 1)
$f = 68.0 \quad F = 5.0 \quad 2\omega = 35.3°$

| | Radius of Curvature | Distance | Refractive Index | Abbe Number |
|---|---|---|---|---|
| Main lens | $r_1$ 11.965 | $d_1$ 4.500 | $n_1$ 1.69680 | $\nu_1$ 56.47 |
| | $r_2$ 24.785 | $d_2$ 1.800 | | |
| | $r_3$ −35.651 | $d_3$ 1.200 | $n_2$ 1.64769 | $\nu_2$ 33.88 |
| | $r_4$ 11.098 | $d_4$ 1.100 | | |
| | $r_5$ 19.423 | $d_5$ 4.000 | $n_3$ 1.77250 | $\nu_3$ 49.77 |
| | $r_6$ −19.423 | $d_6$ 0.150 | | |
| | $r_7^*$ −28.159 | $d_7$ 1.300 | $n_4$ 1.49140 | $\nu_4$ 57.82 |
| | $r_8$ −91.526 | $d_8$ 1.300 | | |
| | $r_9$ Diaphragm | $d_9$ 1.800 | | |
| Rear conversion lens | $R_1^*$ −3334.333 | $D_1$ 1.900 | $N_1$ 1.58400 | $V_1$ 31.00 |
| | $R_2$ −18.682 | $D_2$ 1.000 | | |
| | $R_3$ −14.322 | $D_3$ 2.421 | $N_2$ 1.59270 | $V_2$ 35.29 |
| | $R_4$ −6.557 | $D_4$ 1.221 | $N_3$ 1.85000 | $V_3$ 40.04 |
| | $R_5$ −38.379 | | | |

| Coefficient of aspherical surface of $r_7^*$ | Coefficient of aspherical surface of $R_1^*$ | h | Δ(h) |
|---|---|---|---|
| a = 0.0 | A = 0.0 | 0 | 0.0 |
| b = −0.12491 × 10⁻⁴ | B = 0.12975 × 10⁻³ | 1.0 | −0.0001 |
| c = −0.42177 × 10⁻⁷ | C = 0.16095 × 10⁻⁵ | 2.0 | −0.0022 |
| d = 0.11229 × 10⁻⁷ | D = 0.27366 × 10⁻⁷ | 3.0 | −0.0119 |
| e = 0.44337 × 10⁻¹² | E = 0.23507 × 10⁻¹¹ | 4.0 | −0.0416 |
| f = −0.85153 × 10⁻¹⁶ | F = 0.43704 × 10⁻¹⁴ | 4.55 | −0.0749 |

$0 < h < 4.55$
$-\Phi_1 f = 2.668$
$N_n - N_p = 0.2575$

TABLE 4

(Embodiment 1)
$f = 68.0 \quad F = 5.0 \quad 2\omega = 35.3°$

| | Radius of Curvature | Distance | Refractive Index | Abbe Number |
|---|---|---|---|---|
| Main lens | $r_1$ 11.965 | $d_1$ 4.500 | $n_1$ 1.69680 | $\nu_1$ 56.47 |
| | $r_2$ 24.785 | $d_2$ 1.800 | | |
| | $r_3$ −35.651 | $d_3$ 1.200 | $n_2$ 1.64769 | $\nu_2$ 33.88 |
| | $r_4$ 11.098 | $d_4$ 1.100 | | |
| | $r_5$ 19.423 | $d_5$ 4.000 | $n_3$ 1.77250 | $\nu_3$ 49.77 |
| | $r_6$ −19.423 | $d_6$ 0.150 | | |
| | $r_7^*$ −28.159 | $d_7$ 1.300 | $n_4$ 1.49140 | $\nu_4$ 57.82 |
| | $r_8$ −91.526 | $d_8$ 1.300 | | |
| | $r_9$ Diaphragm | $d_9$ 1.800 | | |
| Rear | $R_1^*$ −307.651 | $D_1$ 1.900 | $N_1$ 1.58400 | $V_1$ 31.00 |
| | $R_2$ −14.814 | $D_2$ 0.900 | | |

TABLE 4-continued (Embodiment 1)  
$f = 68.0 \quad F = 5.0 \quad 2\omega = 35.3°$

| | | | | | |
|---|---|---|---|---|---|
| conversion lens | $R_3$ −12.350 | $D_3$ 2.364 | $N_2$ 1.61650 | $V_2$ 30.98 | |
| | $R_4$ −7.359 | $D_4$ 1.069 | $N_3$ 1.87800 | $V_3$ 38.14 | |
| | $R_5$ −42.821 | | | | |

| Coefficient of aspherical surface of $r_7$* | Coefficient of aspherical surface of $R_1$* | h | Δ(h) |
|---|---|---|---|
| a = 0.0 | A = 0.0 | 0 | 0.0 |
| b = −0.12491 × 10$^{-4}$ | B = 0.97577 × 10$^{-4}$ | 1.0 | −0.0001 |
| c = −0.42177 × 10$^{-7}$ | C = 0.10788 × 10$^{-5}$ | 2.0 | −0.0016 |
| d = 0.11229 × 10$^{-7}$ | D = 0.92460 × 10$^{-8}$ | 3.0 | −0.0088 |
| e = 0.44337 × 10$^{-12}$ | E = 0.33309 × 10$^{-11}$ | 4.0 | −0.0300 |
| f = −0.85153 × 10$^{-16}$ | F = 0.43939 × 10$^{-14}$ | 4.55 | −0.0536 |

$0 < h < 4.56$
$-\Phi_1 f = 2.416$
$N_n - N_p = 0.2615$

TABLE 5

(Embodiment 3)  
$f = 68.0 \quad F = 5.0 \quad 2\omega = 35.3°$

| | | Radius of Curvature | Distance | Refractive Index | Abbe Number |
|---|---|---|---|---|---|
| Main lens | | $r_1$ 11.965 | $d_1$ 4.500 | $n_1$ 1.69680 | $\nu_1$ 56.47 |
| | | $r_2$ 24.785 | $d_2$ 1.800 | | |
| | | $r_3$ −35.651 | $d_3$ 1.200 | $n_2$ 1.64769 | $\nu_2$ 33.88 |
| | | $r_4$ 11.098 | $d_4$ 1.100 | | |
| | | $r_5$ 19.423 | $d_5$ 4.000 | $n_3$ 1.77250 | $\nu_3$ 49.77 |
| | | $r_6$ −19.423 | $d_6$ 0.150 | | |
| | | $r_7$* −28.159 | $d_7$ 1.300 | $n_4$ 1.49140 | $\nu_4$ 57.82 |
| | | $r_8$ −91.526 | $d_8$ 1.300 | | |
| | | $r_9$ Diaphragm | $d_9$ 1.800 | | |
| Rear conversion lens | | $R_1$ −87.347 | $D_1$ 1.900 | $N_1$ 1.58400 | $V_1$ 31.00 |
| | | $R_2$* −15.544 | $D_2$ 1.000 | | |
| | | $R_3$ −14.296 | $D_3$ 2.393 | $N_2$ 1.59270 | $V_2$ 35.29 |
| | | $R_4$ −6.513 | $D_4$ 1.230 | $N_3$ 1.85000 | $V_3$ 40.04 |
| | | $R_5$ −36.396 | | | |

| Coefficient of aspherical surface of $r_7$* | Coefficient of aspherical surface of $R_2$* | h | Δ(h) |
|---|---|---|---|
| a = 0.0 | A = 0.0 | 0 | 0.0 |
| b = −0.12491 × 10$^{-4}$ | B = −0.12808 × 10$^{-3}$ | 1.0 | −0.0001 |
| c = −0.42177 × 10$^{-7}$ | C = −0.10945 × 10$^{-5}$ | 2.0 | −0.0021 |
| d = 0.11229 × 10$^{-7}$ | D = 0.18850 × 10$^{-7}$ | 3.0 | −0.0110 |
| e = 0.44337 × 10$^{-12}$ | E = 0.86383 × 10$^{-12}$ | 4.0 | −0.0360 |
| f = −0.85153 × 10$^{-16}$ | F = 0.21751 × 10$^{-16}$ | 4.45 | −0.0558 |

$0 < h < 4.45$
$-\Phi_1 f = 2.686$
$N_n - N_p = 0.2573$

TABLE 6

(Embodiment 4)  
$f = 68.0 \quad F = 5.0 \quad 2\omega = 35.3°$

| | | Radius of Curvature | Distance | Refractive Index | Abbe Number |
|---|---|---|---|---|---|
| Main lens | | $r_1$ 11.965 | $d_1$ 4.500 | $n_1$ 1.69680 | $\nu_1$ 56.47 |
| | | $r_2$ 24.785 | $d_2$ 1.800 | | |
| | | $r_3$ −35.651 | $d_3$ 1.200 | $n_2$ 1.64769 | $\nu_2$ 33.88 |
| | | $r_4$ 11.098 | $d_4$ 1.100 | | |
| | | $r_5$ 19.423 | $d_5$ 4.000 | $n_3$ 1.77250 | $\nu_3$ 49.77 |
| | | $r_6$ −19.423 | $d_6$ 0.150 | | |
| | | $r_7$* −28.159 | $d_7$ 1.300 | $n_4$ 1.49140 | $\nu_4$ 57.82 |
| | | $r_8$ 91.526 | $d_8$ 1.300 | | |
| | | $r_9$ Diaphragm | $d_9$ 1.700 | | |
| Rear conversion lens | | $R_1$* 236.273 | $D_1$ 1.900 | $N_1$ 1.49140 | $V_1$ 57.82 |
| | | $R_2$ −12.873 | $D_2$ 0.700 | | |
| | | $R_3$ −11.071 | $D_3$ 2.330 | $N_2$ 1.59270 | $V_2$ 35.29 |
| | | $R_4$ −6.085 | $D_4$ 1.172 | $N_3$ 1.77250 | $V_3$ 49.77 |
| | | $R_5$ −48.182 | | | |

| Coefficient of aspherical surface of $r_7$* | Coefficient of aspherical surface of $R_1$* | h | Δ(h) |
|---|---|---|---|
| a = 0.0 | A = 0.0 | 0 | 0.0 |
| b = −0.12491 × 10$^{-4}$ | B = 0.16317 × 10$^{-3}$ | 1.0 | −0.0002 |

TABLE 6-continued (Embodiment 4)
$f = 68.0 \quad F = 5.0 \quad 2\omega = 35.3°$

| | | | |
|---|---|---|---|
| $c = -0.42177 \times 10^{-7}$ | $C = 0.23272 \times 10^{-5}$ | 2.0 | −0.0028 |
| $d = 0.11229 \times 10^{-7}$ | $D = 0.29436 \times 10^{-7}$ | 3.0 | −0.0151 |
| $e = 0.44337 \times 10^{-12}$ | $E = -0.26438 \times 10^{-11}$ | 4.0 | −0.0532 |
| $f = -0.85153 \times 10^{-16}$ | $F = -0.47344 \times 10^{-14}$ | 4.01 | −0.0538 |

$0 < h < 4.01$
$-\Phi_1 f = 2.009$
$N_n - N_p = 0.1798$

TABLE 7

(Embodiment 5)
$f = 68.0 \quad F = 5.0 \quad 2\omega = 35.3°$

| | | Radius of Curvature | Distance | Refractive Index | Abbe Number |
|---|---|---|---|---|---|
| Main lens | | $r_1$ 12.266 | $d_1$ 4.600 | $n_1$ 1.69680 | $\nu_1$ 56.47 |
| | | $r_2$ 27.112 | $d_2$ 1.650 | | |
| | | $r_3$ −38.243 | $d_3$ 1.200 | $n_2$ 1.63980 | $\nu_2$ 34.55 |
| | | $r_4$ 11.108 | $d_4$ 1.260 | | |
| | | $r_5$ 20.546 | $d_5$ 3.700 | $n_3$ 1.75450 | $\nu_3$ 51.57 |
| | | $r_6$ −20.516 | $d_6$ 0.150 | | |
| | | $r_7^*$ −37.813 | $d_7$ 1.500 | $n_4$ 1.49140 | $\nu_4$ 57.82 |
| | | $r_8$ −500.000 | $d_8$ 1.300 | | |
| | | $r_9$ Diaphragm | $d_9$ 1.900 | | |
| Rear conversion lens | | $R_1^*$ 116.596 | $D_1$ 2.200 | $N_1$ 1.58400 | $V_1$ 31.00 |
| | | $R_2$ −16.114 | $D_2$ 1.100 | | |
| | | $R_3$ −11.734 | $D_3$ 1.092 | $N_2$ 1.85000 | $V_2$ 40.04 |
| | | $R_4$ 42.619 | $D_4$ 2.367 | $N_3$ 1.57309 | $V_3$ 42.59 |
| | | $R_5$ −43.438 | | | |

| Coefficient of aspherical surface of $r_7^*$ | Coefficient of aspherical surface of $R_1^*$ | h | Δ(h) |
|---|---|---|---|
| $a = 0.0$ | $A = 0.0$ | 0 | 0.0 |
| $b = -0.74385 \times 10^{-5}$ | $B = 0.642728 \times 10^{-4}$ | 1.0 | −0.0001 |
| $c = 0.20710 \times 10^{-6}$ | $C = -0.54802 \times 10^{-8}$ | 2.0 | −0.0010 |
| $d = 0.69128 \times 10^{-8}$ | $D = 0.28141 \times 10^{-7}$ | 3.0 | −0.0054 |
| $e = 0.40660 \times 10^{-12}$ | $E = -0.62427 \times 10^{-12}$ | 4.0 | −0.0184 |
| $f = 0.15528 \times 10^{-16}$ | $F = -0.22330 \times 10^{-14}$ | 4.61 | −0.0349 |

$0 < h < 4.61$
$-\Phi_1 f = 0.442$
$N_n - N_p = 0.27691$

TABLE 8

(Embodiment 6)
$f = 68.0 \quad F = 5.0 \quad 2\omega = 35.3°$

| | | Radius of Curvature | Distance | Refractive Index | Abbe Number |
|---|---|---|---|---|---|
| Main lens | | $r_1$ 12.266 | $d_1$ 4.600 | $n_1$ 1.69680 | $\nu_1$ 56.47 |
| | | $r_2$ 27.112 | $d_2$ 1.650 | | |
| | | $r_3$ −38.243 | $d_3$ 1.200 | $n_2$ 1.63980 | $\nu_2$ 34.55 |
| | | $r_4$ 11.108 | $d_4$ 1.260 | | |
| | | $r_5$ 20.546 | $d_5$ 3.700 | $n_3$ 1.75450 | $\nu_3$ 51.57 |
| | | $r_6$ −20.516 | $d_6$ 0.150 | | |
| | | $r_7^*$ −37.813 | $d_7$ 1.500 | $n_4$ 1.49140 | $\nu_4$ 57.82 |
| | | $r_8$ −500.000 | $d_8$ 1.300 | | |
| | | $r_9$ Diaphragm | $d_9$ 1.900 | | |
| Rear conversion lens | | $R_1$ 140.327 | $D_1$ 2.200 | $N_1$ 1.58400 | $V_1$ 31.00 |
| | | $R_2^*$ −15.290 | $D_2$ 1.100 | | |
| | | $R_3$ −10.891 | $D_3$ 1.092 | $N_2$ 1.85000 | $V_2$ 40.04 |
| | | $R_4$ 29.053 | $D_4$ 2.362 | $N_3$ 1.58144 | $V_3$ 40.83 |
| | | $R_5$ −28.667 | | | |

| Coefficient of aspherical surface of $r_7^*$ | Coefficient of aspherical surface of $R_2^*$ | h | Δ(h) |
|---|---|---|---|
| $a = 0.0$ | $A = 0.0$ | 0 | 0.0 |
| $b = -0.74385 \times 10^{-5}$ | $B = -0.87869 \times 10^{-4}$ | 1.0 | −0.0001 |
| $c = 0.20710 \times 10^{-6}$ | $C = -0.10943 \times 10^{-5}$ | 2.0 | −0.0015 |
| $d = 0.69128 \times 10^{-8}$ | $D = 0.25883 \times 10^{-7}$ | 3.0 | −0.0077 |
| $e = 0.40660 \times 10^{-12}$ | $E = -0.21231 \times 10^{-11}$ | 4.0 | −0.0253 |
| $f = 0.15528 \times 10^{-16}$ | $F = -0.25435 \times 10^{-14}$ | 4.44 | −0.0386 |

$0 < h < 4.44$
$-\Phi_1 f = 0.629$
$N_n - N_p = 0.26856$

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A compound lens system consisting of a main lens system and a rear conversion lens system located at the image side of the main lens system for obtaining a focal length longer than the focal length of only the main lens system, wherein the rear conversion lens system comprises from the object side to the image side:
   a first positive single lens component made of a synthetic resin material and having an aspheric surface; and
   a second negative compound lens component consisting of a positive lens element and a negative lens element;
   and wherein the rear conversion lens system fulfills the following conditions:

$$1.4 < N_1 < 1.6$$

$$0.01 < N_n - N_p < 0.4$$

$$t_F(h) < r_e(1 - \{1 - (h/r_e)^2\}^{\frac{1}{2}}) - r_k(1 - \{1 - (h/r_k)^2\}^{\frac{1}{2}}) + d_F$$

$$0.1 < -\phi_4 \cdot f < 10.0$$

wherein;

$N_1$ represents refractive index of the first positive single lens component;

$N_n$ represents refractive index of the negative lens element of the second negative compound lens component;

$N_p$ represents refractive index of the positive lens element of the second negative compound lens component;

h represents height from the optical axis of the rear conversion lens system;

$t_F(h)$ represents thickness of the first positive single lens component at the height h in the condition of $0 < h < R_F$;

$r_e$ represents paraxial radius of curvature of the image side surface of the first positive single lens component;

$r_k$ represents paraxial radius of curvature of the image side surface of the first positive single lens component;

$R_F$ represents the minimum value among, and an effective height of the aspheric surface of the first positive single lens component;

$d_F$ represents axial thickness of the first positive single lens component;

$\phi_4$ represents refractive power of a cemented surface on which the positive and negative lens elements of the second negative compound lens component are cemented with each other; and f represents focal length of the compound lens system consisting of the main lens system and the rear conversion lens system.

2. A rear conversion lens system as claimed in claim 1, wherein the rear conversion lens system further fulfills the following condition:

$$1.3 < -\phi_4 \cdot f < 4.0.$$

3. A rear conversion lens system as claimed in claim 2, wherein the object side surface of the first positive single lens component is aspheric.

4. A rear conversion lens system as claimed in claim 2, wherein the image side surface of the first positive single lens component is aspheric.

5. A rear conversion lens system as claimed in claim 2, wherein the second negative compound lens component consisting of, from the object side, a positive lens element, and a negative lens element cemented to the positive lens element.

6. A rear conversion lens system as claimed in claim 2, wherein the second negative compound lens component consisting of, from the object side, a negative lens element, and a positive lens element cemented to the negative lens element.

7. A rear conversion lens system as claimed in claim 2, wherein the rear conversion lens system fulfills the following design parameters:

| | | f = 68.0 F = 5.0 2ω = 35.3° | | | |
|---|---|---|---|---|---|
| Main lens | | $r_1$ 11.965 | $d_1$ 4.500 | $n_1$ 1.69680 | $\nu_1$ 56.47 |
| | | $r_2$ 24.785 | $d_2$ 1.800 | | |
| | | $r_3$ −35.651 | $d_3$ 1.200 | $n_2$ 1.64769 | $\nu_2$ 33.88 |
| | | $r_4$ 11.098 | $d_4$ 1.100 | | |
| | | $r_5$ 19.423 | $d_5$ 4.000 | $n_3$ 1.77250 | $\nu_3$ 49.77 |
| | | $r_6$ −19.423 | $d_6$ 0.150 | | |
| | | $r_7^*$ −28.159 | $d_7$ 1.300 | $n_4$ 1.49140 | $\nu_4$ 57.82 |
| | | $r_8$ −91.526 | $d_8$ 1.300 | | |
| | | $r_9$ Diaphragm | $d_9$ 1.800 | | |
| Rear conversion lens | | $R_1^*$ −307.651 | $D_1$ 1.900 | $N_1$ 1.58400 | $V_1$ 31.00 |
| | | $R_2$ −14.814 | $D_2$ 0.900 | | |
| | | $R_3$ −12.350 | $D_3$ 2.364 | $N_2$ 1.61650 | $V_2$ 30.98 |
| | | $R_4$ −7.359 | $D_4$ 1.069 | $N_3$ 1.87800 | $V_3$ 38.14 |
| | | $R_5$ −42.821 | | | |

| Coefficient of aspherical surface of $r_7^*$ | Coefficient of aspherical surface of $R_1^*$ | h | Δ(h) |
|---|---|---|---|
| a = 0.0 | A = 0.0 | 0 | 0.0 |
| b = −0.12491 × $10^{-4}$ | B = 0.97577 × $10^{-4}$ | 1.0 | −0.0001 |
| c = −0.42177 × $10^{-7}$ | C = 0.10788 × $10^{-5}$ | 2.0 | −0.0016 |
| d = 0.11229 × $10^{-7}$ | D = 0.92460 × $10^{-8}$ | 3.0 | −0.0088 |
| e = 0.44337 × $10^{-12}$ | E = −0.33309 × $10^{-11}$ | 4.0 | −0.0300 |

-continued

| f = 68.0 | F = 5.0 | 2ω = 35.3° | | |
|---|---|---|---|---|
| f = −0.85153 × 10⁻¹⁶ | F = −0.43939 × 10⁻¹⁴ | | 4.56 | −0.0536 |

0 < h < 4.56
−Φ₁f = 2.416
$N_n - N_p = 0.2615$ here, f equals a focal length, F represents an open F number, 2ω is an angle of view, r₁, r₂, ... and R₁, R₂, ... are radiuses of curvature with respective subscripts indicating the surfaces, from the object to image side, along the optical axis, d₁, d₂, ... and D₁, D₂, ... represent the axial distance and includes both air spaces and the actual thickness of the lenses along the optical axis, n₁, n₂, ... equal the refractive indexes of respective lenses and, the subscripts refer to the particular optical element from the object to image side, and ν₁, ν₂, ... and V₁, V₂, ... equal Abbe numbers of respective lenses sequentially counted from the object side, asterisk (*) represents the aspheric surface and the shape of the aspheric surface is expressed by the following equation, $$X = \frac{y}{r_i + r_i\sqrt{1 - \left(\frac{y}{r_i}\right)^2}} + \alpha y^2 + \beta y^4 + \gamma y^6$$

where, the x ordinate is taken in the direction of optical axis, the y ordinate is taken in the direction perpendicular thereto and the paraxial curvature is represented by $r_i$, α, β, γ ... are coefficients of aspherical surface, and the coefficients of aspherical surface of the main lens is represented by a, b, c, ..., and the coefficient of aspherical surface of the rear converter by A, B, C, ..., and also Δ(h) is a difference between the thickness of aspherical surface at a height h and the radius of paraxial curvature of that surface, being evaluated by the following equation, $$\Delta(h) = t_F(h) - \left( r_e\left\{1 - \sqrt{1 - \left(\frac{h}{r_e}\right)^2}\right\} - r_k\left\{1 - \sqrt{1 - \left(\frac{h}{r_e}\right)^2}\right\} + d_F \right)$$

8. A compound lens system consisting of a main lens system and a rear conversion lens system located at the image side of the main lens system for obtaining a focal length longer than the focal length of only the main lens system, wherein the rear conversion lens system comprises from the object side to the image side:
 a first positive single lens component having an aspheric surface; and
 a second negative compound lens component consisting of a positive lens element and a negative lens element;
 and wherein the rear conversion lens system fulfills the following conditions:

$$0.01 < N_n - N_p < 0.4$$

$$t_F(h) < r_e(1 - \{1 - (h/r_e)^2\}^{\frac{1}{2}}) - r_k(1 - \{1 - (h/r_k)^2\}^{\frac{1}{2}}) + d_F$$

$$0.1 < -\phi_4 \cdot f < 10.0$$

wherein;

$N_n$ represents refractive index of the negative lens element of the second negative compound lens component;

$N_p$ represents refractive index of the positive lens element of the second negative compound lens component;

h represents height from the optical axis of the rear conversion lens system;

$t_F(h)$ represents thickness of the first positive single lens component at the height h in the condition of $0 < h < R_F$;

$r_e$ represents paraxial radius of curvature of the image side surface of the first positive single lens component;

$r_k$ represents paraxial radius of curvature of the image side surface of the first positive single lens component;

$R_F$ represents the minimum value among $|r_e|$, $|r_k|$, and an effective height of the aspheric surface of the first positive single lens component;

$d_F$ represents axial thickness of the first positive single lens component;

$\phi_4$ represents refractive power of a cemented surface on which the positive and negative lens elements of the second negative compound lens component are cemented with each other; and f represents focal length of the compound lens system consisting of the main lens system and the rear conversion lens system.

9. A rear conversion lens system as claimed in claim 8, wherein the rear conversion lens system further fulfills the following condition:

$$1.3 < -\phi_4 \cdot f < 4.0$$

10. A rear conversion lens system as claimed in claim 9, wherein the second negative compound lens component consisting of, from the object side, a positive lens element, and a negative lens element cemented to the positive lens element.

11. A rear conversion lens system as claimed in claim 10, wherein the object side surface of the first positive single lens component is aspheric.

12. A rear conversion lens system as claimed in claim 10, wherein the image side surface of the first positive single lens component is aspheric.

13. A rear conversion lens system as claimed in claim 9, wherein the second negative compound lens component consisting of, from the object side, a negative lens element, and a positive lens element cemented to the negative lens element.

14. A rear conversion lens system as claimed in claim 13, wherein the object side surface of the first positive single lens component is aspheric.

* * * * *